United States Patent
Braganca et al.

(10) Patent No.: US 8,988,833 B2
(45) Date of Patent: Mar. 24, 2015

(54) CURRENT-PERPENDICULAR-TO-THE-PLANE (CPP) MAGNETORESISTIVE SENSOR WITH REDUCED-WIDTH TOP AND BOTTOM ELECTRODES AND METHOD FOR MAKING

(71) Applicant: HGST Netherlands B.V., Amsterdam (NL)

(72) Inventors: Patrick Mesquita Braganca, San Jose, CA (US); Jeffrey R. Childress, San Jose, CA (US); Jordan Asher Katine, Mountain View, CA (US); Yang Li, San Jose, CA (US); Neil Leslie Robertson, Palo Alto, CA (US); Neil Smith, San Jose, CA (US); Petrus Antonius VanDerHeijden, Cupertino, CA (US); Douglas Johnson Werner, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/895,411

(22) Filed: May 16, 2013

(65) Prior Publication Data

US 2014/0340791 A1 Nov. 20, 2014

(51) Int. Cl.
G11B 5/39 (2006.01)
(52) U.S. Cl.
CPC .......... *G11B 5/39* (2013.01); *G11B 2005/3996* (2013.01)
USPC ....................................... 360/322; 360/324.1

(58) Field of Classification Search
USPC ......... 360/322, 324.1, 324.11, 324.12, 324.2, 360/324
See application file for complete search history.

(56) References Cited

U.S. PATENT DOCUMENTS

| | | | |
|---|---|---|---|
| 6,560,077 B2 | 5/2003 | Fujiwara et al. | |
| 6,718,621 B1 | 4/2004 | Hayashi et al. | |
| 7,061,725 B2 * | 6/2006 | Seigler | 360/313 |
| 7,116,528 B2 * | 10/2006 | Nagasaka et al. | 360/322 |
| 7,776,387 B2 | 8/2010 | Fuji et al. | |
| 8,040,641 B2 | 10/2011 | Kanaya et al. | |
| 8,351,165 B2 | 1/2013 | Carey et al. | |
| 2002/0097533 A1 * | 7/2002 | Funayama et al. | 360/324.1 |
| 2002/0135948 A1 * | 9/2002 | Funayama et al. | 360/324.1 |
| 2004/0027731 A1 * | 2/2004 | Hasegawa et al. | 360/322 |
| 2006/0126230 A1 * | 6/2006 | Yuasa et al. | 360/322 |
| 2007/0279809 A1 | 12/2007 | Myiauchi et al. | |
| 2008/0102315 A1 | 5/2008 | Fukuzawa et al. | |

\* cited by examiner

*Primary Examiner* — Jefferson Evans
(74) *Attorney, Agent, or Firm* — Thomas R. Berthold

(57) ABSTRACT

A current-perpendicular-to-the plane magnetoresistive sensor has top and bottom electrodes narrower than the sensor trackwidth. The electrodes are formed of one of Cu, Au, Ag and AgSn, which have an ion milling etch rate much higher than the etch rates for the sensor's ferromagnetic materials. Ion milling is performed at a high angle relative to a line orthogonal to the plane of the electrode layers and the layers in the sensor stack. Because of the much higher etch rate of the material of the top and bottom electrode layers, the electrode layers will have side edges that are recessed from the side edges of the free layer. This reduces the surface areas for the top and bottom electrodes, which causes the sense current passing through the sensor's free layer to be confined in a narrower channel, which is equivalent to having a sensor with narrower physical trackwidth.

5 Claims, 10 Drawing Sheets

CURRENT-PERPENDICULAR-TO-THE-PLANE (CPP) MAGNETORESISTIVE SENSOR WITH REDUCED-WIDTH TOP AND BOTTOM ELECTRODES AND METHOD FOR MAKING

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a method for making a CPP-MR sensor having top and bottom electrodes with a width less than the sensor trackwidth (TW).

2. Background of the Invention

One type of conventional CPP-MR sensor used as the read head in magnetic recording disk drives is based on the giant magnetoresistance (GMR) effect. A GMR spin-valve sensor has a stack of layers that includes two ferromagnetic layers separated by a nonmagnetic electrically conductive spacer layer, which is typically copper (Cu) or silver (Ag). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. In addition to CPP-GMR read heads, another type of CPP-MR sensor is a magnetic tunnel junction sensor, also called a tunneling MR or TMR sensor, in which the nonmagnetic spacer layer is a very thin nonmagnetic tunnel barrier layer formed of an electrically insulating material, such as $TiO_2$, MgO, or $Al_2O_3$.

To achieve higher areal density in magnetic recording disk drives, it is necessary to reduce the CPP-MR sensor trackwidth (TW). A reduction in the sensor physical TW is difficult because of the small dimensions required. However, if the sense current passing perpendicularly through the sensor is confined in a narrower channel, this is equivalent to having a sensor with a narrower physical TW. In conventional CPP-MR sensors, the top and bottom electrodes, which are typically the magnetic shield layers, have the same width or a wider width than the sensor TW, which prevents the current from flowing in a narrower channel.

What is needed is a CPP-MR sensor with top and bottom electrodes that are narrower than the sensor TW so that the current can flow in a narrower channel, and a method for making the sensor with the electrodes being self-aligned or centered with respect to the free layer.

SUMMARY OF THE INVENTION

The invention relates to a CPP-MR sensor with top and bottom electrodes that are narrower than the sensor TW, and to a method for making the sensor. The sensor has top and bottom electrodes located between the sensor and the respective top and bottom shields that are formed of one of Cu, Au, Ag and AgSn. These materials have an ion milling etch rate substantially higher, for example 2-4 times greater, than the etch rates for the ferromagnetic materials of the sensor. A first ion milling is performed vertically relative to the plane of the electrode layers and the layers in the sensor stack. Then a second ion milling is performed at a high angle, between about 50 and 90 degrees, relative to a line orthogonal to the plane of the layers. Because of the much higher etch rate of the material of the top and bottom electrode layers, the electrode layers will have side edges that are recessed from the side edges of the free layer. This reduces the surface areas for the top and bottom electrodes, which causes the sense current passing through the sensor's free layer to be confined in a narrower channel, which is equivalent to having a sensor with narrower physical TW. The top electrode will have a width less than the width of the bottom electrode layer because it is exposed to the angled ion milling for a longer period of time. If the CPP sensor is a GMR sensor then the spacer layer will also have recessed side edges as a result of the angled ion milling because the spacer material will typically be formed of the same or similar materials as the materials of the top and bottom electrodes.

For a fuller understanding of the nature and advantages of the present invention, reference should be made to the following detailed description taken together with the accompanying figures.

DETAILED DESCRIPTION OF THE INVENTION

Figure 1:
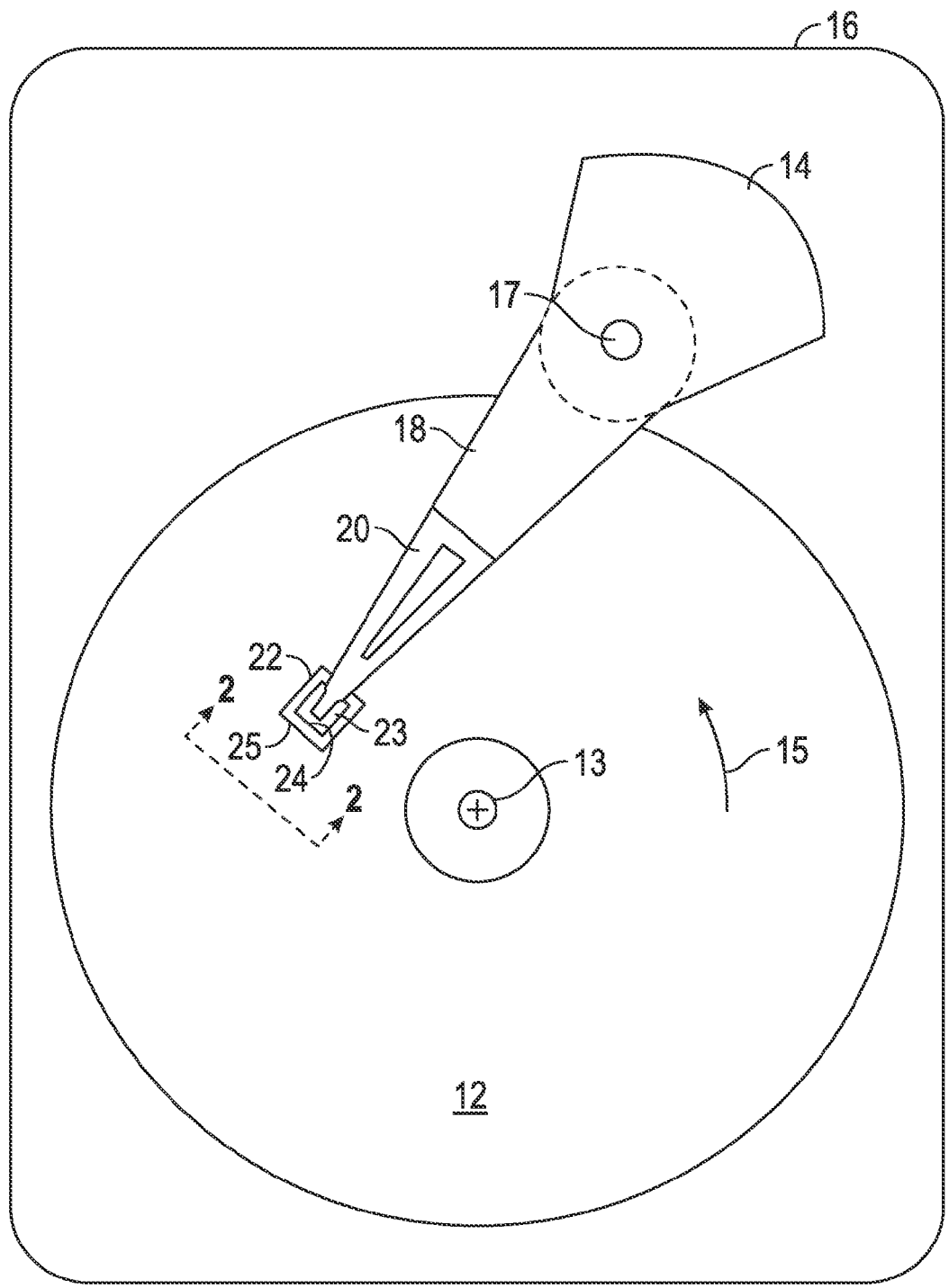
FIG. 1 is a schematic top view of a conventional magnetic recording hard disk drive with the cover removed.

The CPP magnetoresistive (MR) sensor made by the method of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
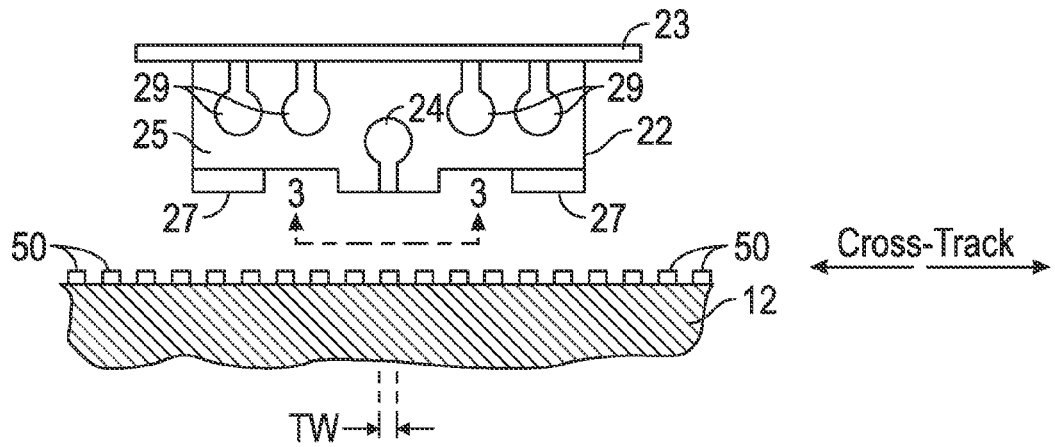
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
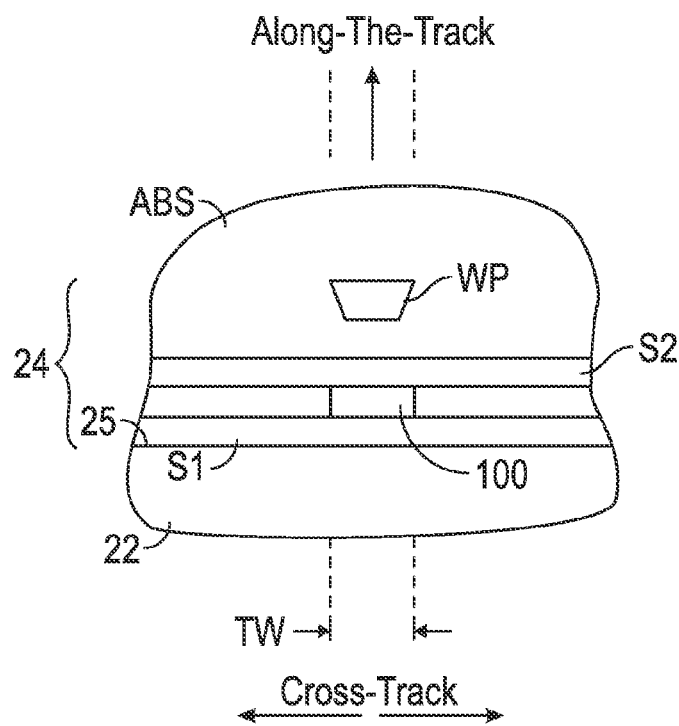
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP-MR sensor or read head 100 is located between two magnetic shields S1 and S2. The shields S1, S2 are formed of magnetically permeable material, typically a NiFe alloy, and may also be electrically conductive so they can function as the electrical leads to the read head 100. The shields function to shield the read head 100 from recorded data bits that are neighboring the data bit being read. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4A:
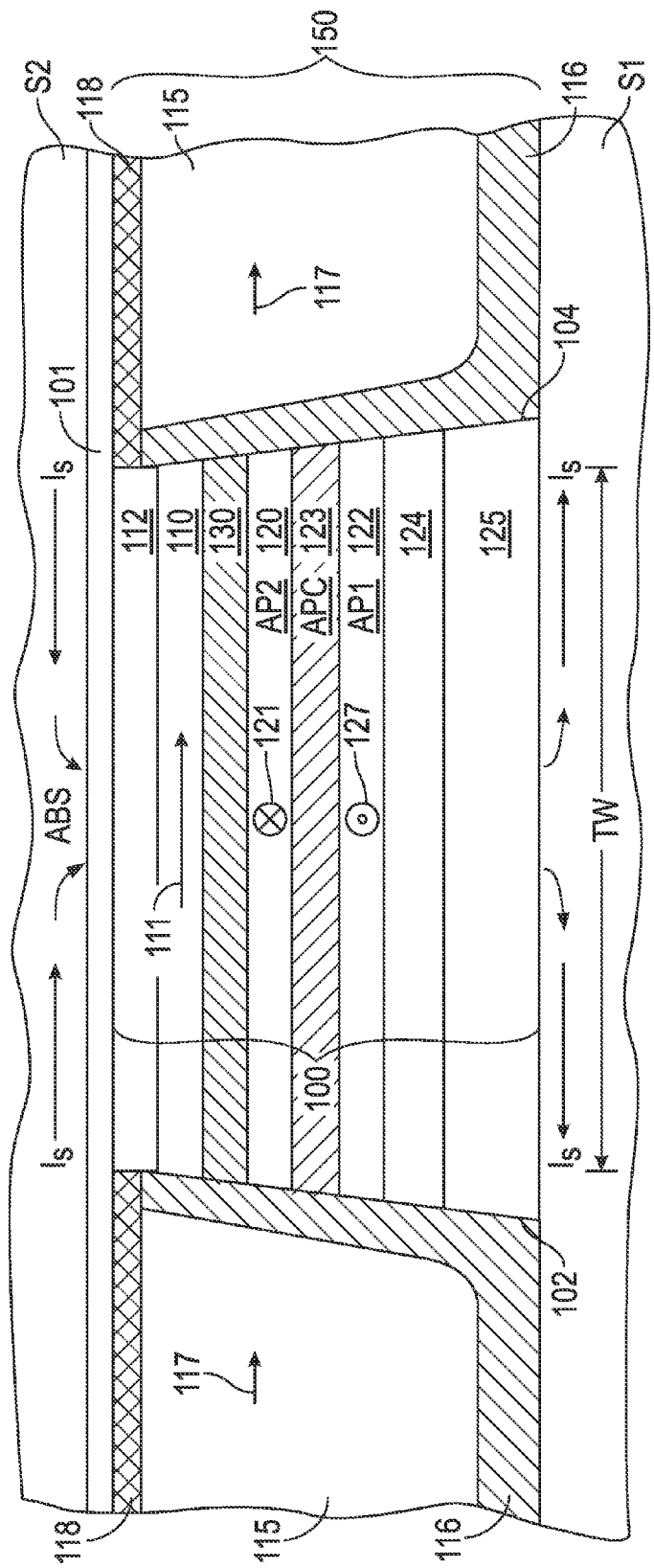
FIG. 4A is a cross-sectional schematic view of a current-perpendicular-to-the-plane magnetoresistive (CPP-MR) read head structure according to the prior art.

FIG. 4A is a view of the ABS showing the layers making up a prior art CPP-MR sensor structure as would be viewed from the disk. Sensor 100 is a CPP-MR read head comprising a stack of layers formed between the two magnetic shield layers S1, S2. The sensor 100 has a front edge at the ABS and spaced-apart side edges 102, 104 that define the track width (TW). The shields S1, S2 are formed of electrically conductive material and thus may also function as electrical leads for the sense current $I_S$, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. A seed layer 101, such as a thin Ru/NiFe bilayer, is deposited, typically by sputtering, below S2 to facilitate the electroplating of the relatively thick S2.

The sensor 100 layers include a ferromagnetic reference layer 120 having a fixed magnetic moment or magnetization direction 121 oriented transversely (into the page), a ferromagnetic free layer 110 having a magnetic moment or magnetization direction 111 that can rotate in the plane of layer 110 in response to transverse external magnetic fields to be sensed from the disk 12, and a nonmagnetic spacer layer 130 between the reference layer 120 and free layer 110. The CPP-MR sensor 100 may be a CPP GMR sensor, in which case the nonmagnetic spacer layer 130 would be formed of an electrically conducting metallic material, typically a metal or metal alloy like Cu, a Cu alloy, Au or Ag. Alternatively, the CPP-MR sensor 100 may be a CPP tunneling MR(CPP-TMR) sensor, in which case the nonmagnetic spacer layer 130 would be a tunnel barrier formed of an electrically insulating material, like $TiO_2$, MgO or alumina ($Al_2O_3$).

The pinned ferromagnetic layer in a CPP-MR sensor may be a single or "simple" pinned layer or an antiparallel (AP) pinned structure like that shown in FIG. 4A. The pinned layer in the CPP GMR sensor in FIG. 4 is a well-known AP-pinned structure with reference ferromagnetic layer 120 (AP2) and a lower ferromagnetic layer 122 (AP1) that are antiferromagnetically coupled across an AP coupling (APC) layer 123. The APC layer 123 is typically Ru, Ir, Rh, Cr or alloys thereof. The AP1 and AP2 layers, as well as the free ferromagnetic layer 110, are typically formed of crystalline CoFeB, CoFe or NiFe alloys, or a multilayer of these materials, such as a CoFe/NiFe bilayer. The AP1 and AP2 ferromagnetic layers have their respective magnetization directions 127, 121 oriented antiparallel. The AP1 layer 122 may have its magnetization direction pinned by being exchange-coupled to an antiferromagnetic (AF) layer 124 as shown in FIG. 4. The AF layer 124 is typically a Mn alloy, e.g., PtMn, NiMn, FeMn, IrMn, PdMn, PtPdMn or RhMn.

A seed layer 125 may be located between the lower shield layer S1 and the AF layer 124 to enhance the growth of the AF layer 124. The seed layer 125 is typically one or more layers of NiFeCr, NiFe, Ta, Cu or Ru. A capping layer 112 is located between the free ferromagnetic layer 110 and the upper shield layer S2. The capping layer 112 provides corrosion protection and may be a single layer or multiple layers of different materials, such as Ru, Ta, Ti, or a Ru/Ta/Ru, Ru/Ti/Ru, or Cu/Ru/Ta trilayer.

In the presence of an external magnetic field in the range of interest, i.e., magnetic fields from recorded data on the disk, the magnetization direction 111 of free layer 110 will rotate while the magnetization direction 127 of reference layer 120 will remain fixed and not rotate. Thus when a sense current $I_S$ is applied from top shield S2 perpendicularly through the sensor stack to bottom shield S1 (or from S1 to S2), the magnetic fields from the recorded data on the disk will cause rotation of the free-layer magnetization 111 relative to the reference-layer magnetization 127, which is detectable as a change in electrical resistance.

A ferromagnetic biasing structure 150 is formed outside of the sensor stack near the side edges 102, 104 of the sensor 100, particularly near the side edges of free layer 110. The structure 150 includes a ferromagnetic biasing layer 115, which may be a high crystalline anisotropy ($K_u$) and thus high coercivity ($H_c$) layer, i.e., a "hard bias" layer. The structure 150 also has a capping layer 118 on the biasing layer 115 and may include an optional seed layer (not shown) below the biasing layer 115. The structure 150 is electrically isolated from side edges 102, 104 of sensor 100 by a thin electrically insulating layer 116, which is typically alumina but may also be a silicon nitride ($SiN_x$) or another metal oxide like a Ta oxide or a Ti oxide. The shield layer S1 serves as a substrate for the hard biasing structure 150, with the insulating layer 116 being located between the biasing structure 150 and S1. The biasing layer 115 has a magnetization 117 generally parallel to the ABS and thus longitudinally biases the magnetization 111 of the free layer 110. Thus in the absence of an external magnetic field the magnetization 117 of biasing layer 115 is parallel to the magnetization 111 of the free layer 110.

Figure 4B:
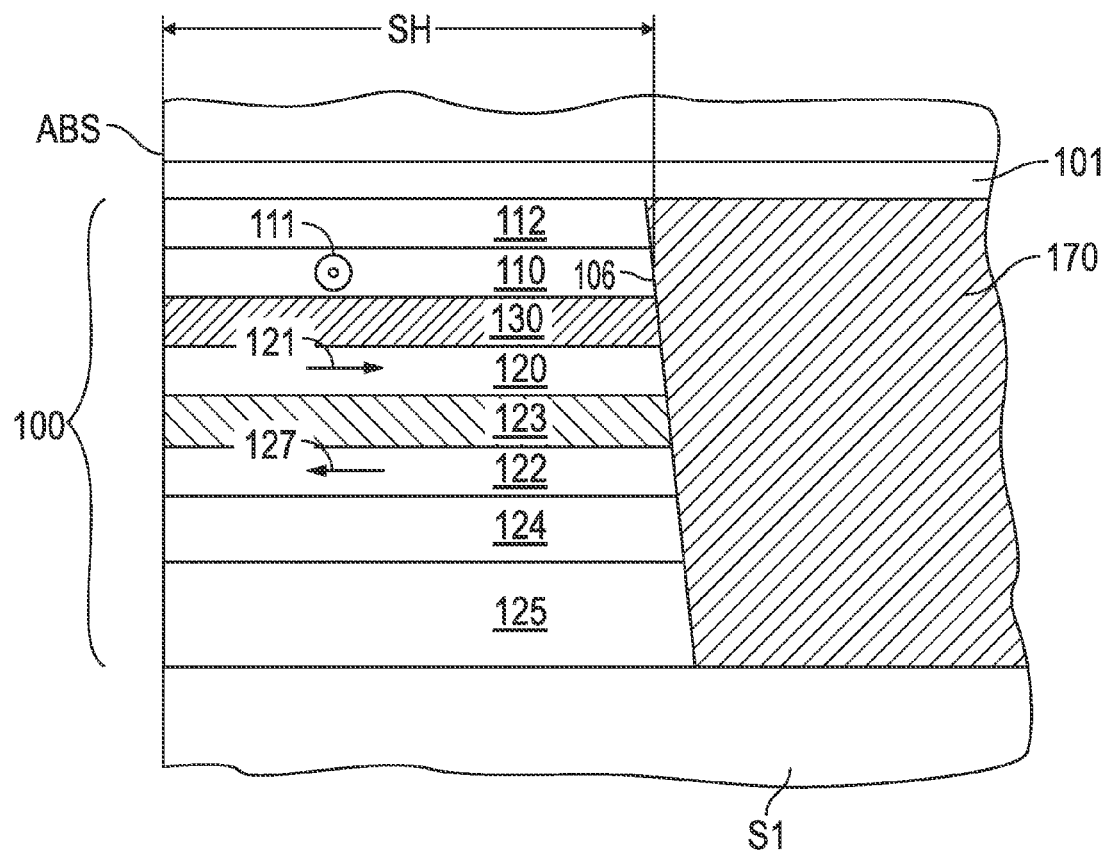
FIG. 4B is a sectional view of the CPP-TMR read head of FIG. 4A taken through a plane orthogonal to both the air-bearing surface (ABS) and to the planes of the layers in the sensor stack.

FIG. 4B is a sectional view of the CPP-TMR sensor structure of FIG. 4A taken through a plane orthogonal to both the ABS and to the planes of the layers in the sensor stack. The free layer 110 has a back edge 106 recessed from the ABS by a distance that defines the stripe height (SH) of the free layer 110. A layer 170 of insulating backfill material, typically alumina, is formed on the reference layer 120 and adjacent the back edge 106 of the free layer 110.

To achieve higher areal density in magnetic recording, it is necessary to reduce the CPP-MR sensor TW. A reduction in the physical TW is difficult because of the small dimensions required. However, if the sense current $I_s$ passing through the sensor is confined in a narrower channel, this is equivalent to having a sensor with narrower physical TW. As shown in the prior art sensor of FIG. 4A, the entire top shield S2 functions as the top electrode and thus sense current $I_s$ passes through the entire sensor between side edges 102 and 104 to bottom shield S1, which functions as the bottom electrode.

Figure 5A:
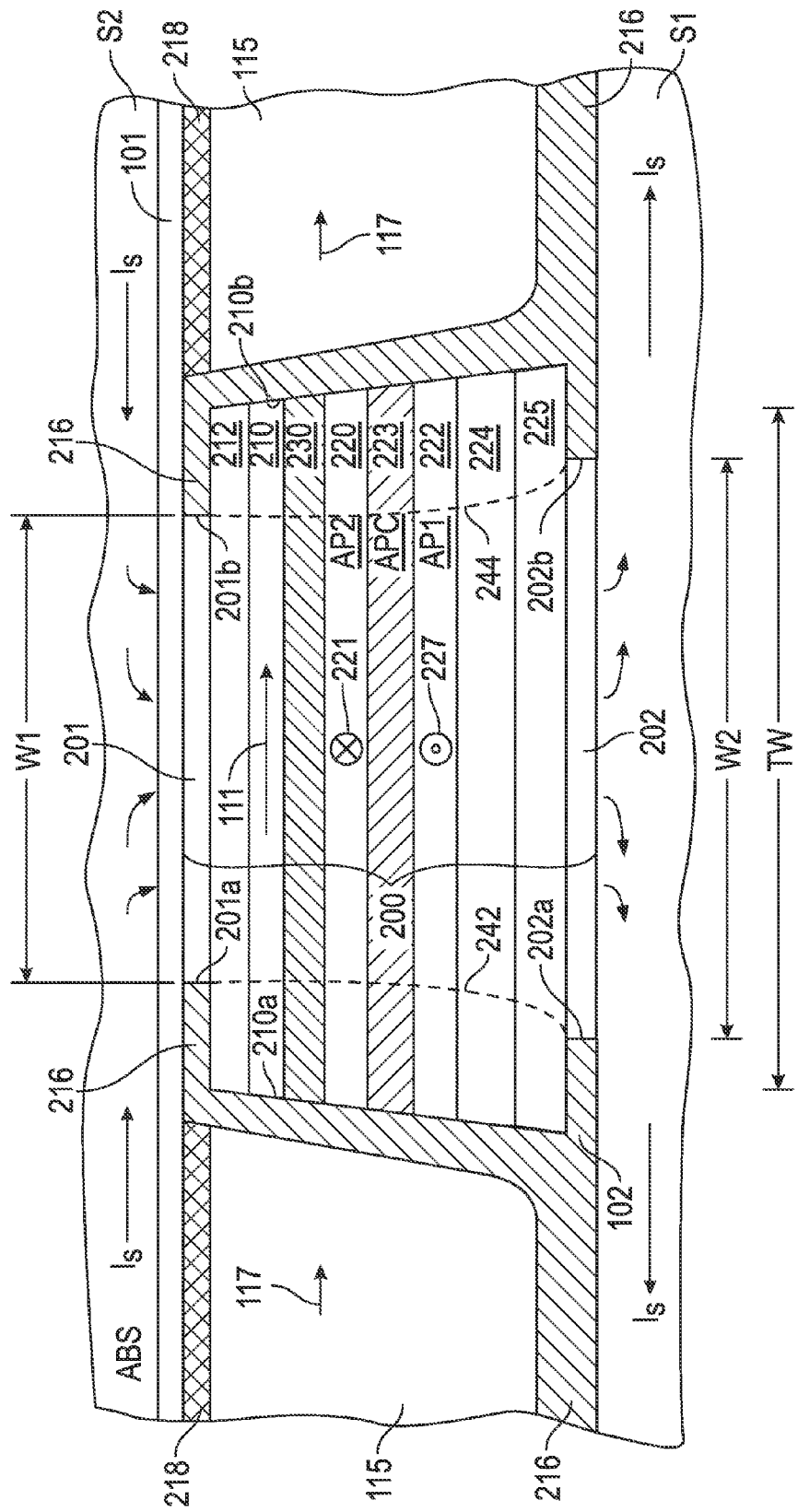
FIG. 5A is a view of the ABS showing the layers making up a CPP-MR sensor structure with reduced-width top and bottom electrodes according to the invention.

FIG. 5A is a view of the ABS showing the layers making up a CPP-MR sensor structure with reduced-width top and bottom electrically conducting metallic electrodes according to the invention. The sensor 200 includes a stack of layers including seed layer 225, AF layer 224, AP1 layer 222 with magnetization 227, APC layer 223, AP2 layer 220 with magnetization 221, nonmagnetic spacer layer 230, free layer 210 with magnetization 211 and capping layer 212. The sensor structure includes a top electrode 201 with side edges 201a, 201b that define a width W1 less than TW and a bottom electrode 202 with side edges 202a, 202b that define a width W2 also less than TW. The free layer 210 has side edges 201a, 201b that define the TW. The top and bottom electrodes 201, 202 are formed of electrically conducting metallic material, and are surrounded by an insulating material 216. The sense current Is is confined to enter the top of the sensor 200 through the top electrode 201 and because of the relatively short conductive path, i.e., the thickness of the stack of layers in sensor 200, the current does not spread out significantly before it reaches the bottom electrode 202. The sensor thus has an effective TW defined by dashed lines 242, 244, which increases the sensitivity of the sensor, i.e., the ability to sense smaller magnetic bit sizes from the disk.

Figure 5B:
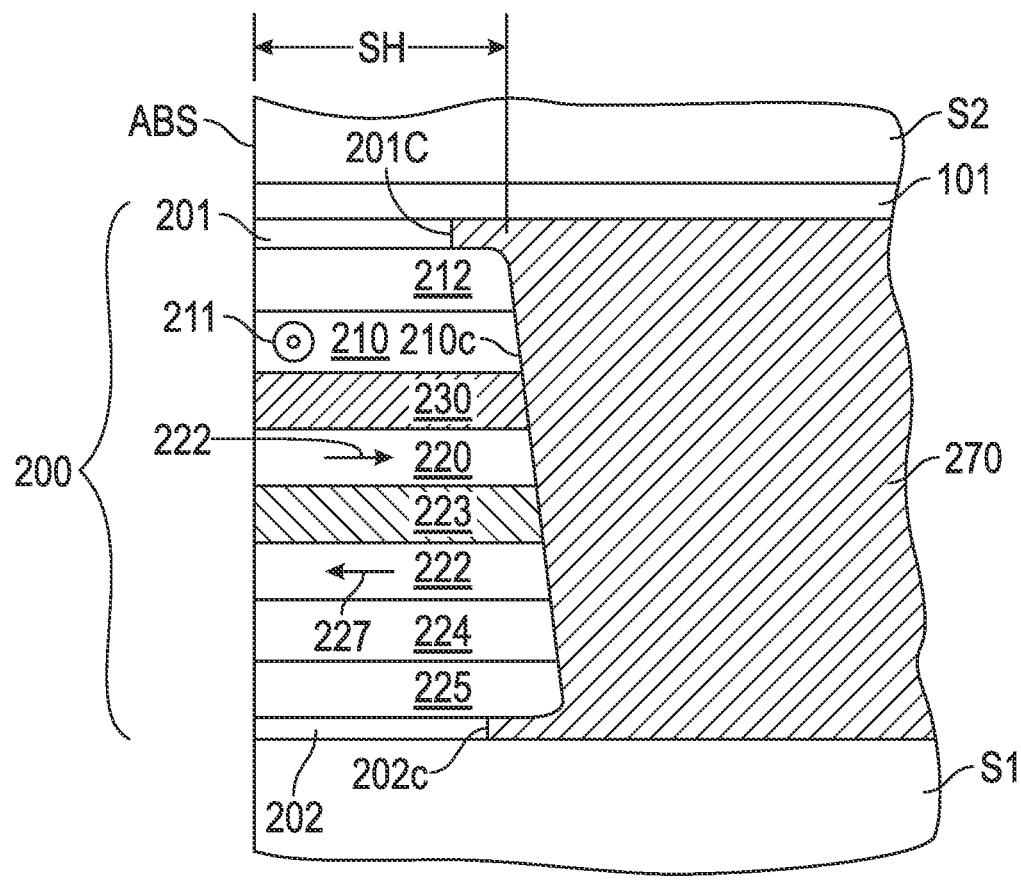
FIG. 5B is a sectional view of the CPP-TMR read head of FIG. 5A taken through a plane orthogonal to both the air-bearing surface (ABS) and to the planes of the layers in the sensor stack.

FIG. 5B is a sectional view of the CPP-MR sensor structure of FIG. 5A taken through a plane orthogonal to both the ABS and to the planes of the layers in the sensor stack. The free layer 210 has a back edge 210c recessed from the ABS by a distance that defines the stripe height (SH) of the free layer 210. The top electrode layer 201 has a back edge 201c recessed from the back edge 201c of the free layer 210, and the bottom electrode layer 202 has a back edge 202c also recessed from the back edge 210c of the free layer 210. A layer 270 of insulating backfill material, typically alumina, is formed on the shield S1 and adjacent the back edges of the sensor 200 stack.

Figure 6A:
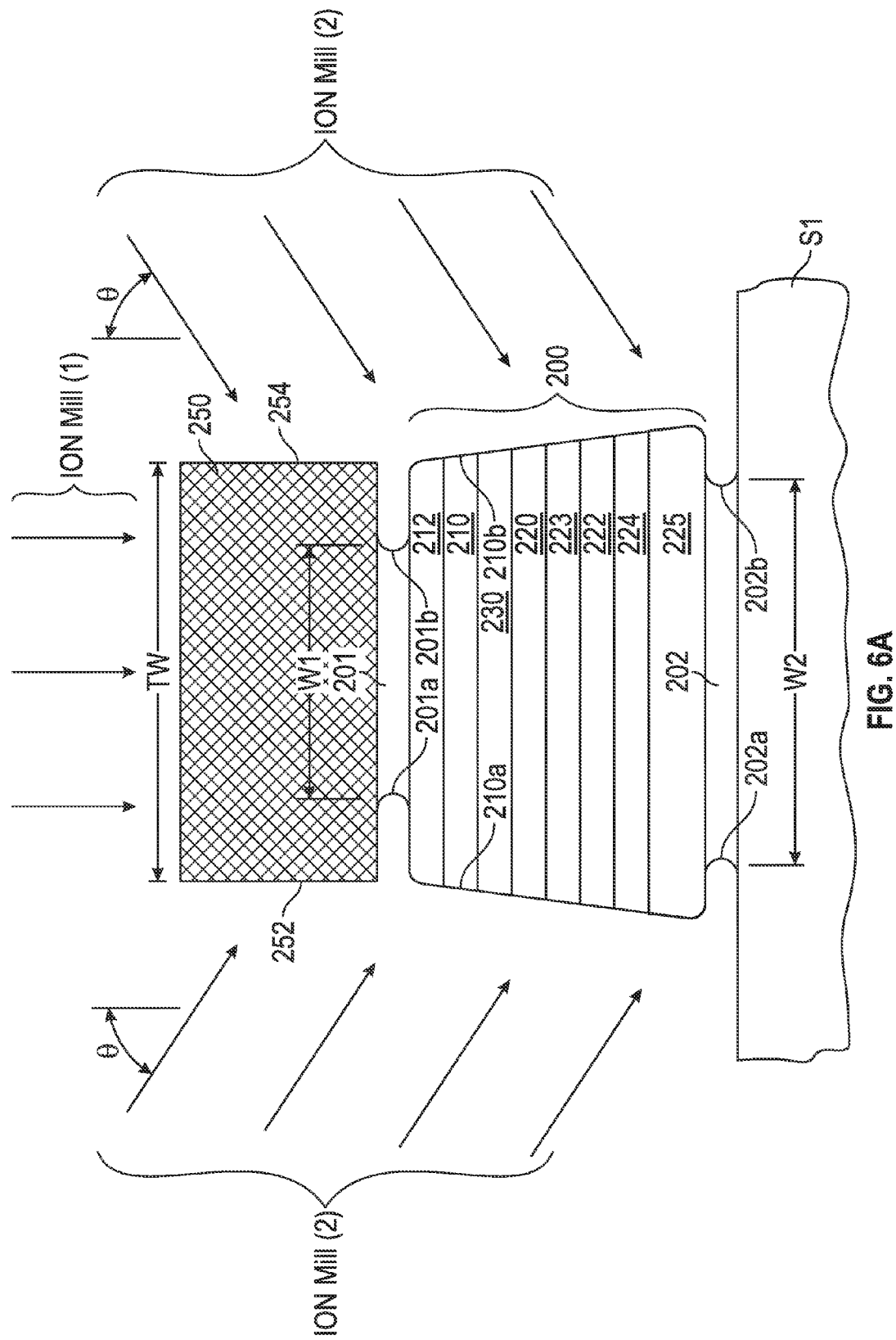
FIG. 6A illustrates the sensor structure after the two ion milling steps form the self-aligned reduced-width top and bottom electrodes.

This invention is also a method for making the sensor structure with both the top and bottom reduced-width electrodes "self-aligned" with the sensor, i.e., the top and bottom electrodes 201, 202 become precisely aligned relative to the center of the sensor during the fabrication process. FIG. 6A illustrates the sensor structure after the two ion milling steps form the self-aligned top and bottom electrodes with reduced width. The bottom electrode layer 202, the sensor stack 200 (layers 225, 224, 222, 223, 220, 230, 210 and 212), and top electrode layer 201 are deposited as full films on shield S1. The material of the electrode layers 201, 202 is a soft metallic material, like Cu, Au, Ag and AgSn alloy. These materials have a significantly higher ion milling etch rate than the material of the free layer 210 and other layers in the stack 200. A layer of patterned photoresist 250 is formed on top of top electrode layer 201. The photoresist 250 is patterned with side edges 252, 254 to define the free layer 210 TW. A first ion milling is then performed vertically relative to the plane of the layers in the stack 200. This removes the material not covered by photoresist 250 down to shield S1. Then a second ion milling is performed at a high angle θ relative to a line orthogonal to the plane of the layers in the stack 200. The angle θ is between 50 and 90 degrees, preferably between 60 and 75 degrees. Because of the much higher etch rate of the material of the top and bottom electrode layers 201, 202, the electrode layers have side edges 201a, 201b and 202a, 202b, respectively, that are recessed from the side edges 210a, 210b of free layer 210. Top electrode layer 201 will have a width W1 and bottom electrode layer 202 will have a width W2. Both W1 and W2 will be less than TW, but W1 will be less than W2 because it is exposed to the second ion milling for a longer period of time. After the high-angle ion milling, the region milled away is then filled with an insulating layer, the ferromagnetic biasing layer and capping layer (layers 216, 115 and 218 in FIG. 5A). The photoresist layer 250 is removed, and then, after chemical-mechanical polishing (CMP), the seed layer (layer 101 in FIG. 5A) is deposited, followed by deposition of shield layer S2, which may be electroplated.

The ion-milling can be performed with Ar ions using an Ion Beam Etching (IBE) tool. For the second ion milling step the ion milling may be performed on one side of the sensor stack 200 using one side edge (252 or 254) of the photoresist layer 250 as a mask, then the structure rotated 180 degrees about an axis orthogonal to the planes of the layers in the stack 200, and then ion milling is performed on the other side of the sensor stack 200 using the other side edge of the photoresist layer 250 as a mask. Alternatively, the structure can be continuously rotated during the second ion milling step.

Figure 6B:
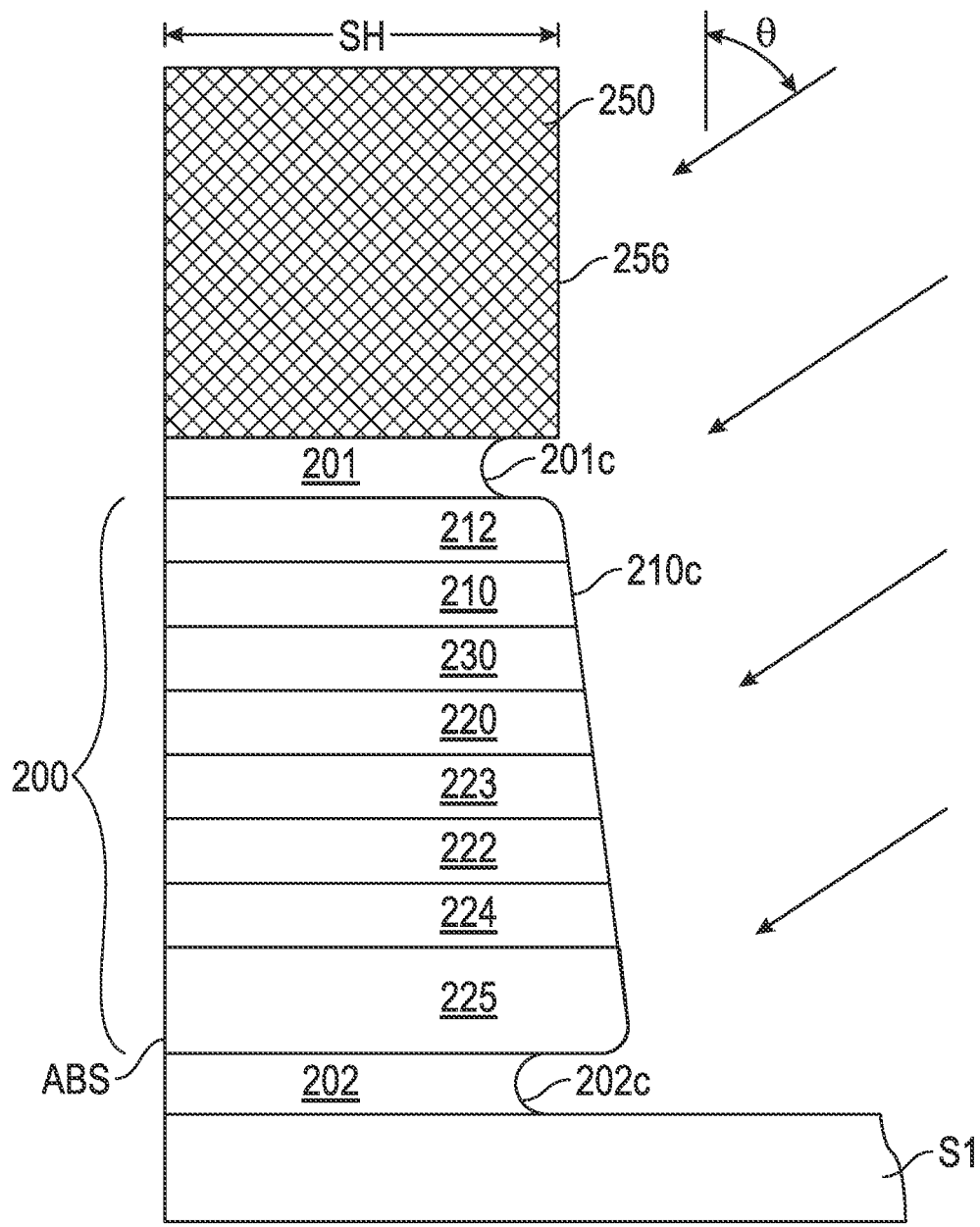
FIG. 6B is a sectional view of the sensor structure of FIG. 6A taken through a plane orthogonal to both the air-bearing surface (ABS) and to the planes of the layers in the sensor stack and illustrates the recessed back edges of the top and bottom electrode layers.

If it is desired to also have the top and bottom electrodes have a back edge recessed from the free layer back edge, then high-angle ion milling can also be performed on the back edge of the sensor stack 200. This is illustrated in FIG. 6B. In this example the same photoresist 250 has also been patterned to have a back edge 256 to define the free layer SH. The second ion milling can be performed while the structure is rotating about an axis orthogonal to the planes of the layers making up the stack 200, so the high-angle ion milling forms the recessed side edges and the recessed back edges at the same time. Alternatively, the back edge can be high-angle ion milled first, the structure rotated 90 degrees, and then the side edges high-angle ion milled. After the high-angle ion milling, the region behind the back edge is refilled with an insulating material (layer 270 in FIG. 5B), typically alumina, tantalum oxide or a silicon nitride ($SiN_x$), which is deposited onto the shield S1 and adjacent the back edges of the layers in the sensor stack 200.

The amount of edge recession of the electrode layers can be controlled by the ion milling angle and the ion milling duration. The amount of edge recession of the electrode layers is a function of the relative etch rates of the materials of the electrode layers and the materials of the sensor stack. Table 1 below gives the approximate relative etch rates for Ar ion milling of various materials in a direction orthogonal to the plane of the material layer.

TABLE 1

| Material | Etch Rate (relative to 1) |
| --- | --- |
| Cu | 1.0 |
| Au | 1.8 |
| Ag | 2 |
| AgSn | 2 |
| NiFe | 0.5 |
| CoFe | 0.5 |
| IrMn | 0.65 |
| MgO | 0.23 |

The method of the invention can result in the top electrode having a width of between approximately 30 to 80 percent of the free layer TW, depending on the milling angle and duration. For example, for a typical TW of 30 nm, W1 may be between about 9 and 24 nm. Thus each side edge of the top electrode may be recessed by between about 3 and 10 nm from the respective free layer side edge. W2 would be correspondingly wider, for example each side edge of the bottom electrode may be recessed by between about 2 and 5 nm from the respective free layer side edge. W1 may be between about 50 to 90 percent of W2. This reduction in surface area for the top and bottom electrodes causes the sense current passing through the sensor's free layer to be confined in a narrower channel, which is equivalent to having a sensor with narrower physical TW.

Because the free layer edges and the electrode layer edges are being ion milled at the same time and at the same angle, when the high-angle ion milling is completed the amount of recession of the two side edges of the top electrode layer will be the same, and the amount of recession of the two side edges of the bottom electrode layer will be the same. Thus the top and bottom electrodes become self-aligned or centered with respect to the free layer.

Figure 7A:
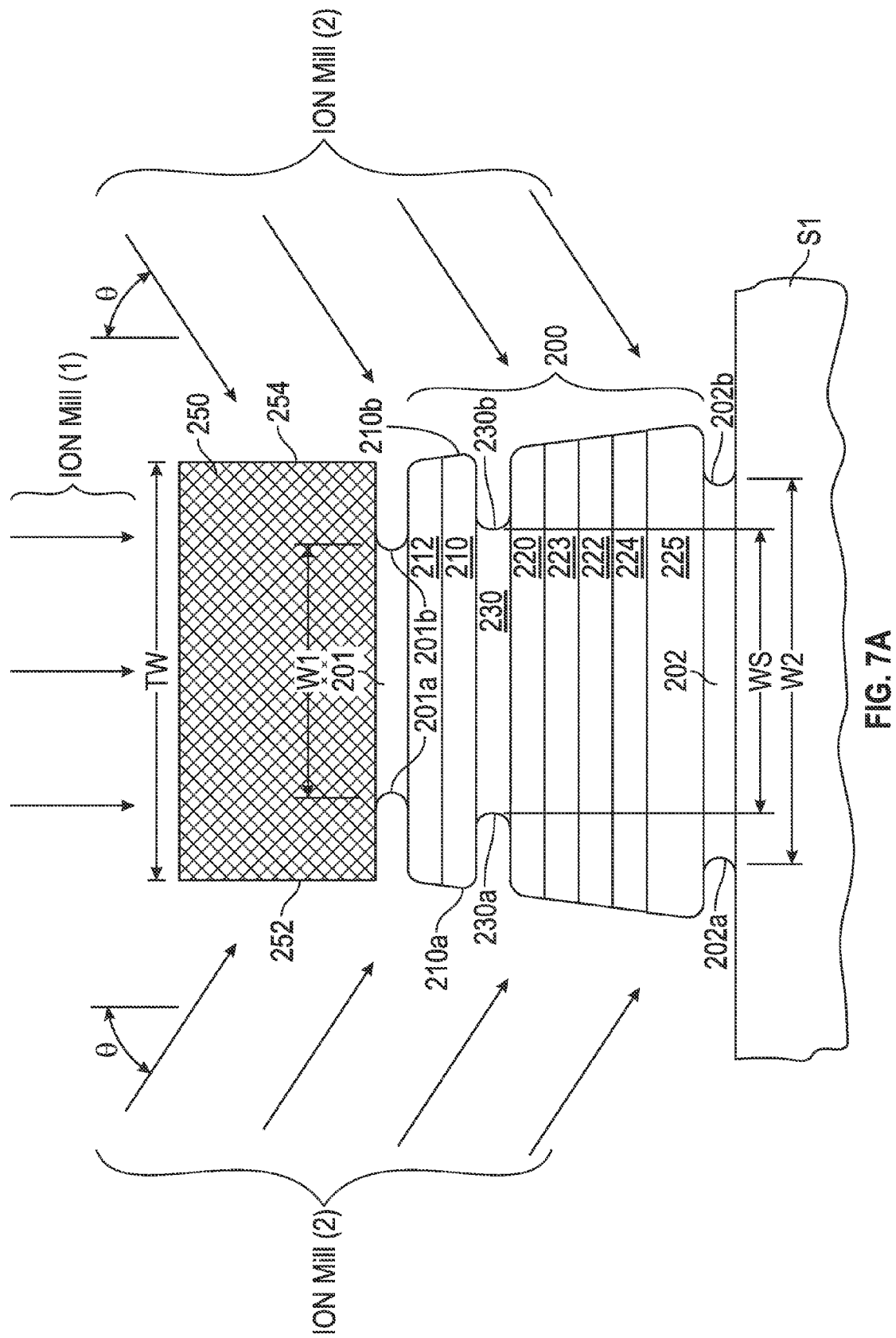
FIG. 7A illustrates a CPP-GMR sensor structure after the two ion milling steps form the self-aligned reduced-width top and bottom electrodes and shows the spacer layer with reduced width.
Figure 7B:
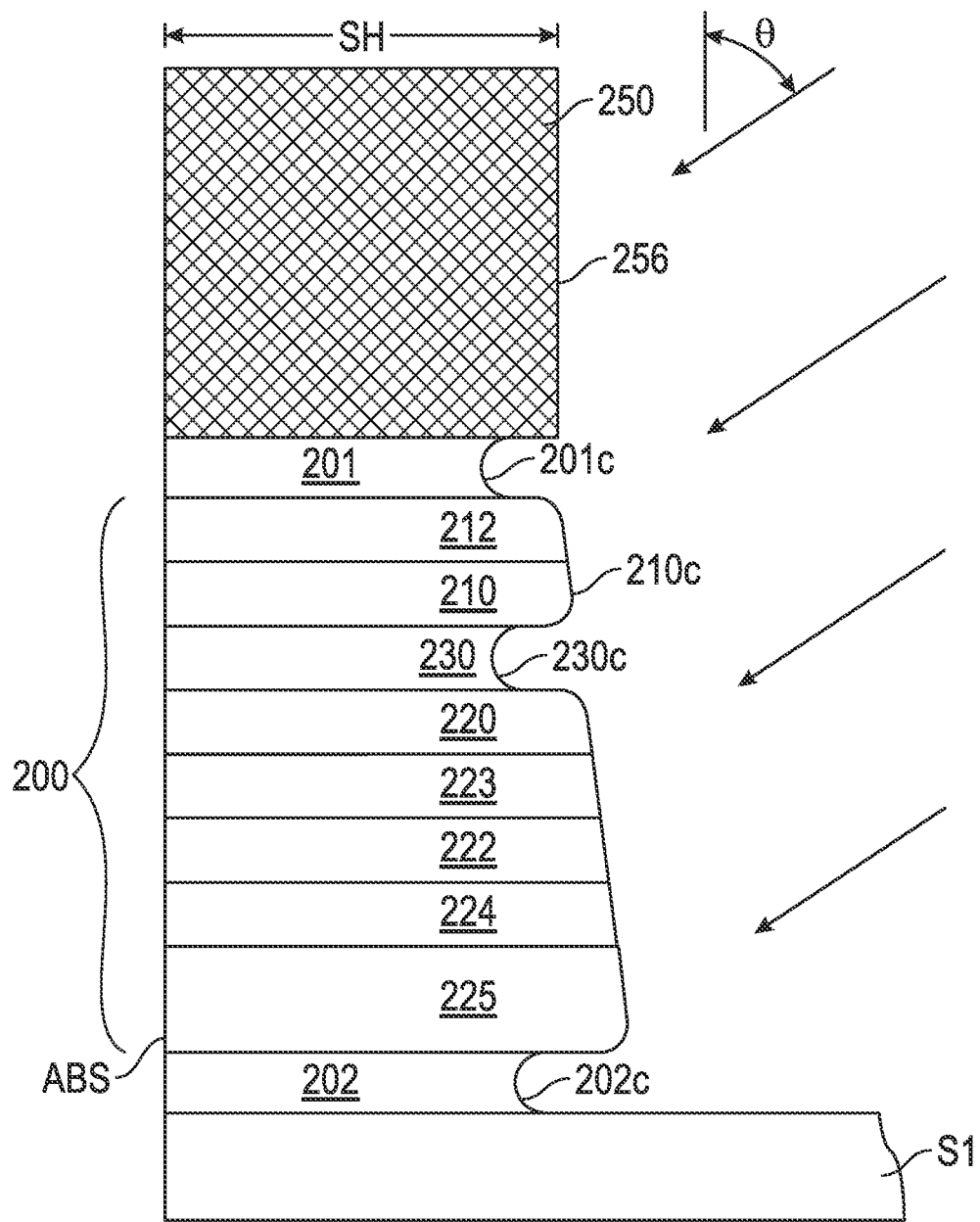
FIG. 7B is a sectional view of the CPP-GMR sensor structure of FIG. 7A taken through a plane orthogonal to both the air-bearing surface (ABS) and to the planes of the layers in the sensor stack and illustrates the recessed back edges of the top and bottom electrode layers and the recessed back edge of the spacer layer.

If the CPP sensor is a TMR sensor then the spacer layer 230 will have side edges generally aligned with the side edges 210, 210b of free layer 210 and a back edge generally aligned with the back edge 210c of free layer 210 because of the relatively low etch rate of MgO, the typical material of the spacer layer material. However if the CPP sensor is a GMR sensor then the spacer layer 230 will also have recessed side edges 230a, 230b, with a width (WS) also less than TW and typically between W1 and W2 (as shown in FIG. 7A), and a recessed back edge 230c (as shown in FIG. 7B) because the spacer material 230 will typically be formed of Ag, Cu or a Cu alloy, which have the same or similar etch rates as the materials of the top and bottom electrodes.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-perpendicular-to-the plane magnetoresistive read head for reading magnetically recorded data from tracks on a magnetic recording disk in a disk drive, the head comprising:
   an air-bearing slider having an air-bearing surface (ABS) for facing the disk and a trailing surface generally orthogonal to the ABS;
   a first shield layer on the trailing surface;
   a bottom electrode layer selected from Cu, Au, Ag and AgSn on the first shield layer;
   a sensor stack of layers on the bottom electrode layer including a pinned ferromagnetic layer having an in-plane magnetization generally orthogonal to the ABS, a nonmagnetic spacer layer selected from Ag, Cu and a Cu alloy on the pinned layer, and a free ferromagnetic layer on the spacer layer and having an in-plane magnetization generally parallel to the ABS in the absence of an external magnetic field and free to rotate in the presence of magnetic fields from recorded data on the disk, the free layer having two spaced-apart side edges that define a trackwidth (TW) parallel to the ABS and a back edge recessed a stripe height (SH) distance from the ABS;
   a top electrode layer selected from Cu, Au, Ag and AgSn on the sensor stack; and
   a second shield layer on the top electrode layer; and
   wherein the bottom electrode layer has two spaced-apart side edges recessed from the side edges of the free layer that define a width (W2) parallel to the ABS less than TW, the spacer layer has two spaced-apart side edges recessed from the side edges of the free layer that define a width (WS) parallel to the ABS less than TW, and the top electrode layer has two spaced-apart side edges recessed from the side edges of the free layer that define a width (W1) parallel to the ABS less than TW.

2. The read head of claim 1 wherein W1 is greater than or equal to 30 percent of TW and less than or equal to 80 percent of TW.

3. The read head of claim 1 wherein W1 is greater than or equal to 50 percent of W2 and less than or equal to 90 percent of W2.

4. The read head of claim 1 further comprising electrically insulating material in contact with the side edges of the free layer and each of the top and bottom electrode layers.

5. The read head of claim 1 wherein the spacer layer and each of the bottom and top electrode layers has a back edge recessed from the back edge of the free layer.

\* \* \* \* \*